United States Patent
Rinne et al.

(10) Patent No.: US 8,724,489 B2
(45) Date of Patent: May 13, 2014

(54) METHOD AND APPARATUS FOR PROVIDING DETECTION OF A COMPATIBLE NETWORK

(75) Inventors: Mika Petri Olavi Rinne, Espoo (FI); Klaus Hugl, Helsinki (FI); Timo Eric Roman, Espoo (FI)

(73) Assignee: Nokia Corporation, Espoo (FI)

( * ) Notice: Subject to any disclaimer, the term of this patent is extended or adjusted under 35 U.S.C. 154(b) by 685 days.

(21) Appl. No.: 12/739,930

(22) PCT Filed: Oct. 24, 2008

(86) PCT No.: PCT/IB2008/054414
§ 371 (c)(1),
(2), (4) Date: Jun. 24, 2010

(87) PCT Pub. No.: WO2009/053944
PCT Pub. Date: Apr. 30, 2009

(65) Prior Publication Data
US 2011/0013530 A1    Jan. 20, 2011

Related U.S. Application Data

(60) Provisional application No. 60/982,974, filed on Oct. 26, 2007.

(51) Int. Cl.
*H04L 12/26* (2006.01)
*H04W 8/22* (2009.01)

(52) U.S. Cl.
CPC .................................... *H04W 8/22* (2013.01)
USPC .......................................... 370/252; 370/350

(58) Field of Classification Search
None
See application file for complete search history.

(56) References Cited

U.S. PATENT DOCUMENTS

| 7,953,119 B2* | 5/2011 | Cho et al. ....................... 370/503 |
| 8,112,102 B2* | 2/2012 | Fischer ......................... 455/458 |
| 2007/0049344 A1* | 3/2007 | Van Der Velde et al. ...... 455/560 |
| 2007/0099652 A1 | 5/2007 | Lindoff et al. |
| 2010/0091750 A1* | 4/2010 | Lee et al. ...................... 370/338 |

FOREIGN PATENT DOCUMENTS

| WO | 2004054149 A | 6/2004 |
| WO | 2007039757 A | 4/2007 |

OTHER PUBLICATIONS

3GPP TSG RAN WG1 Meeting #43, R1-051549, Seoul, Korea, Nov. 7-11, 2005, Source: Nokia, Title: Cell Search procedure for initial synchronization and neighbour cell identification.
3GPP TSG RAN WG1 #44 Meeting R1-060289Denver, CO, USA, Feb. 13-17, 2006 Source: Nokia, Title: EUTRA Cell Search for initial synchronization and neighbor cell identification.
3GPP TSG RAN WG1 Meeting #46, R1-062095, Tallinn, Estonia, Aug. 28-Sep. 1, 2006, Source: NTT DoCoMo, Fujitsu, Mitsubishi Electric, NEC, Panasonic, Toshiba Corporation, Title: Three-Step Cell Search Method for E-UTRA.
3GPP TSG-RAN WG1 Meeting #48 R1-070988, St Louis, MO, USA, Feb. 12-16, 2007, Source: Nokia, Title: Open Issues on Cell Search.

(Continued)

*Primary Examiner* — Rhonda Murphy
(74) *Attorney, Agent, or Firm* — Squire Sanders (US) LLP

(57) ABSTRACT

An approach is provided for searching and detecting cells. System synchronization sequences are detected. An information block on a control channel of one of a plurality of networks is decoded, in response to the detected synchronization sequences. The synchronization sequences are independent of the networks. The information block includes a system indicator specifying release version of the network.

8 Claims, 12 Drawing Sheets

(56) References Cited

OTHER PUBLICATIONS

International Search Report and Written Opinion of the International Searching Authority for PCT Application No. PCT/IB2008/054414, dated Jul. 15, 2009, 12 pages.

Notification of 3rd Office Action dated Jul. 18, 2013 corresponding to Chinese Patent Application No. 200880119308.0 and English translation thereof.

* cited by examiner

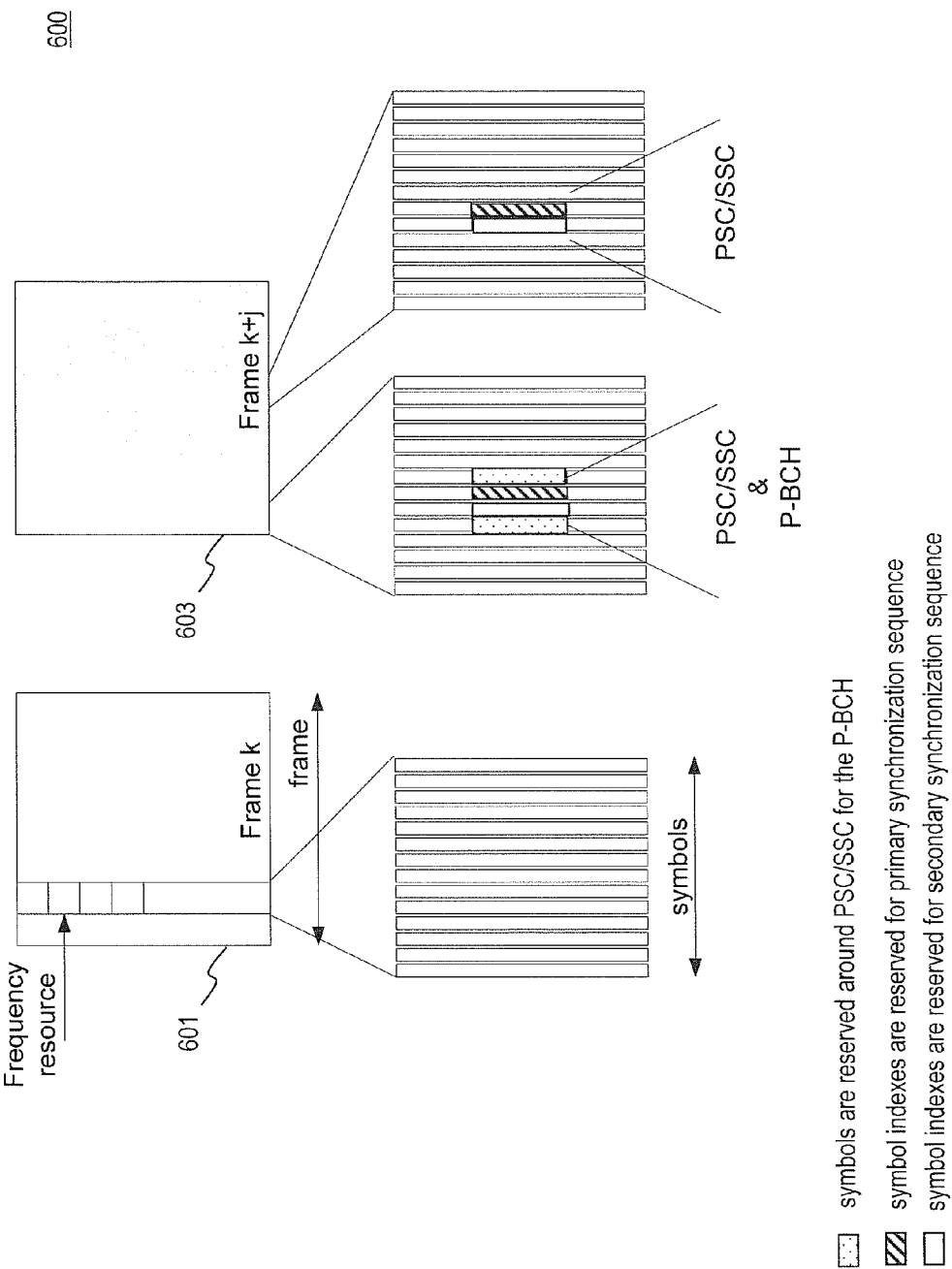

METHOD AND APPARATUS FOR PROVIDING DETECTION OF A COMPATIBLE NETWORK

RELATED APPLICATION

This application was originally filed as PCT Application No. PCT/IB2008/054414 filed Oct. 24, 2008, which claims priority to U.S. Application No. 60/982,974 filed Oct. 26, 2007.

BACKGROUND

Radio communication systems, such as wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. Given the existence of numerous wireless networks, one area of effort involves developing an efficient search procedure for a compatible network among the myriad of networks.

The evolution of cellular technology leads to deployments beyond traditional cellular and local business areas to homes and communities. This results in irregular deployments or presence of ad hoc networks (including temporal ad hoc systems). Because of the existence of many different systems (operating in the same frequency band in a very flexible and un-planned manner), operation of a user equipment (UE) is significantly impacted in that the UE does not necessarily know which carrier types it should search for on a given band. Consequently, the UE has to search for all and any of the systems it might operate on. Furthermore, the number of spectrum bands, their fragmentation and the frequencies on which to operate are generally increasing. All these issues can result in delay of operation and increase consuming of precious power. It is notable that the mobile device does not only search cells for the initial access, but searches cells actively for potential handovers and possible inter-system changes, whenever necessary.

SOME EXEMPLARY EMBODIMENTS

Therefore, there is a need for an approach for efficiently providing cell search and cell detection, which can co-exist with already developed standards and protocols.

According to one embodiment of the invention, a method comprises detecting system synchronization sequences. The method also comprises decoding, in response to the detected synchronization sequences, an information block on a control channel of one of a plurality of networks, wherein the synchronization sequences are independent of the networks, and the information block includes a system indicator specifying release version of the network.

According to another embodiment of the invention, an apparatus comprises a detection logic configured to detect system independent synchronization sequences, and to decode, in response to the detected synchronization sequences, an information block on a control channel of one of a plurality of networks, wherein the synchronization sequences are independent of the networks, and the information block includes a system indicator specifying release version of the network.

According to another embodiment of the invention, a method comprises determining a compatibility class that is supported within a cell. The method also comprises setting a release tag based on the determined class for detection of a cell among a plurality of cells corresponding to heterogeneous systems.

According to another embodiment of the invention, an apparatus comprises logic configured to determine a compatibility class that is supported within a cell, and to set a release tag based on the determined class for detection of a cell among a plurality of cells corresponding to heterogeneous systems.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6 is a diagram of a resource structure configured to accommodate future systems, according to an exemplary embodiment;

DESCRIPTION OF PREFERRED EMBODIMENT

An apparatus, method, and software for providing cell search and detection are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with the Third Generation Partnership Project (3GPP) Long Term Evolution (LTE) or IMT-Advanced) architecture, it is recognized by one of ordinary skill in the art that the embodiments of the inventions have applicability to any type of communication system and equivalent functional capabilities.

Figure 1:
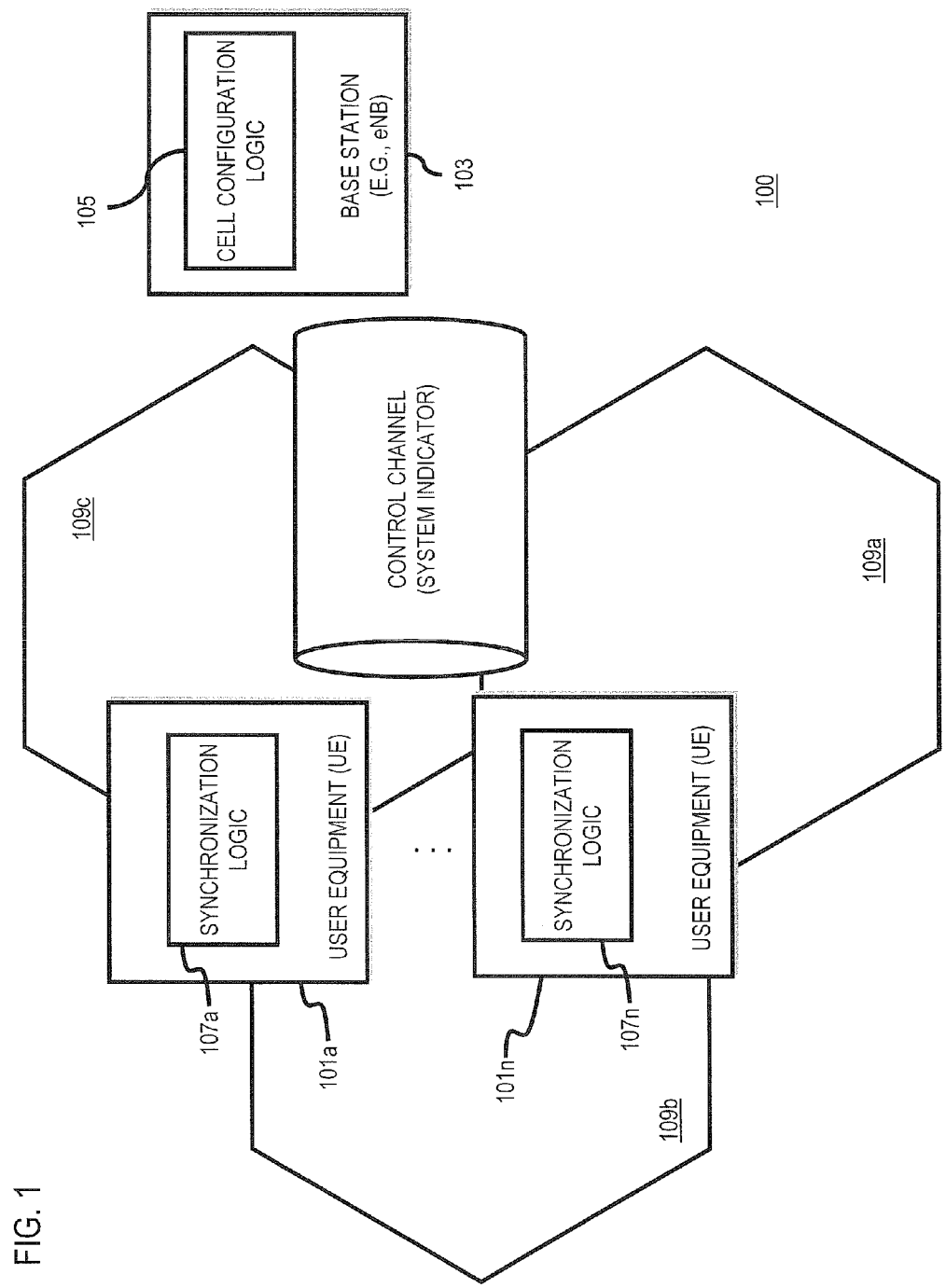
FIG. 1 is a diagram of a communication system capable of providing efficient cell search and synchronization, according to an exemplary embodiment.

FIG. 1 is a diagram of a communication system capable of providing efficient cell search and synchronization, according to an exemplary embodiment. As shown in FIG. 1, a communication system 100 includes one or more user equipment (UEs) 101 communicating with a base station 103, which is part of an access network (e.g., IMT-Advanced (IMTA), WiMAX, 3GPP LTE (or EUTRAN (Evolved UMTS (Universal Mobile Telecommunications System) Terrestrial Radio Access Network) or Beyond 3G, 4G), etc.). IMTA encompasses a family of competing but collaborating systems or networks, that meet similar spectral efficiency requirements and will be allowed to be operated in IMT or IMTA bands. This system 100, according to certain embodiments of this invention, provides simplifications for the common efficiency, to operate in such a multi-band, multi-system, multi-network environment at least to the extent of cell search, network detection and synchronization. Such improved capabilities are not inherent to a conventional IMTA architecture.

Figure 8A:
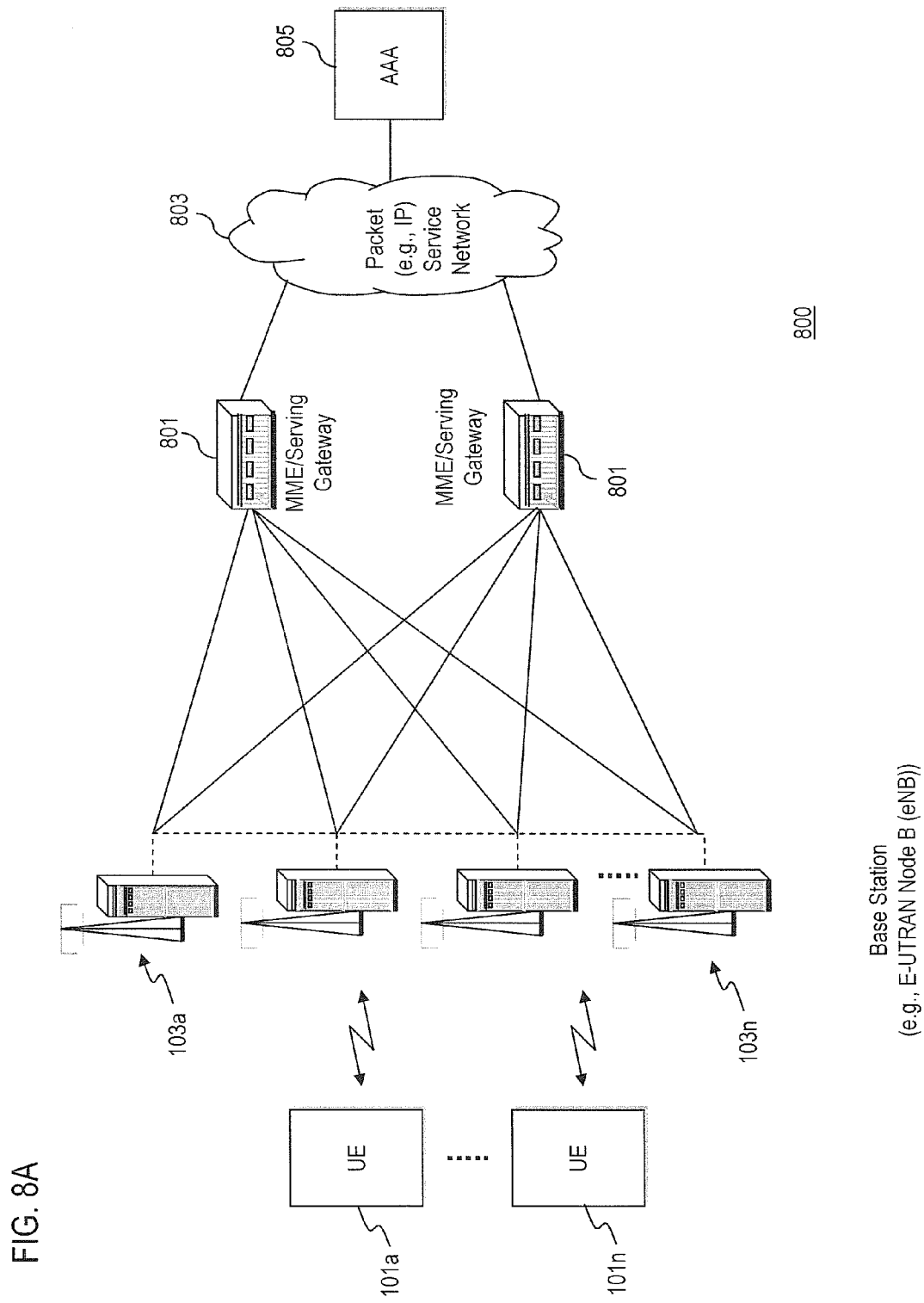
FIGS. 8A-8C are diagrams of communication systems having exemplary long-term evolution (LTE) and E-UTRA (Evolved Universal Terrestrial Radio Access) architectures, in which the system of FIG. 1 can operate to provide detection of a compatible network, according to various exemplary embodiments.
Figure 8B:
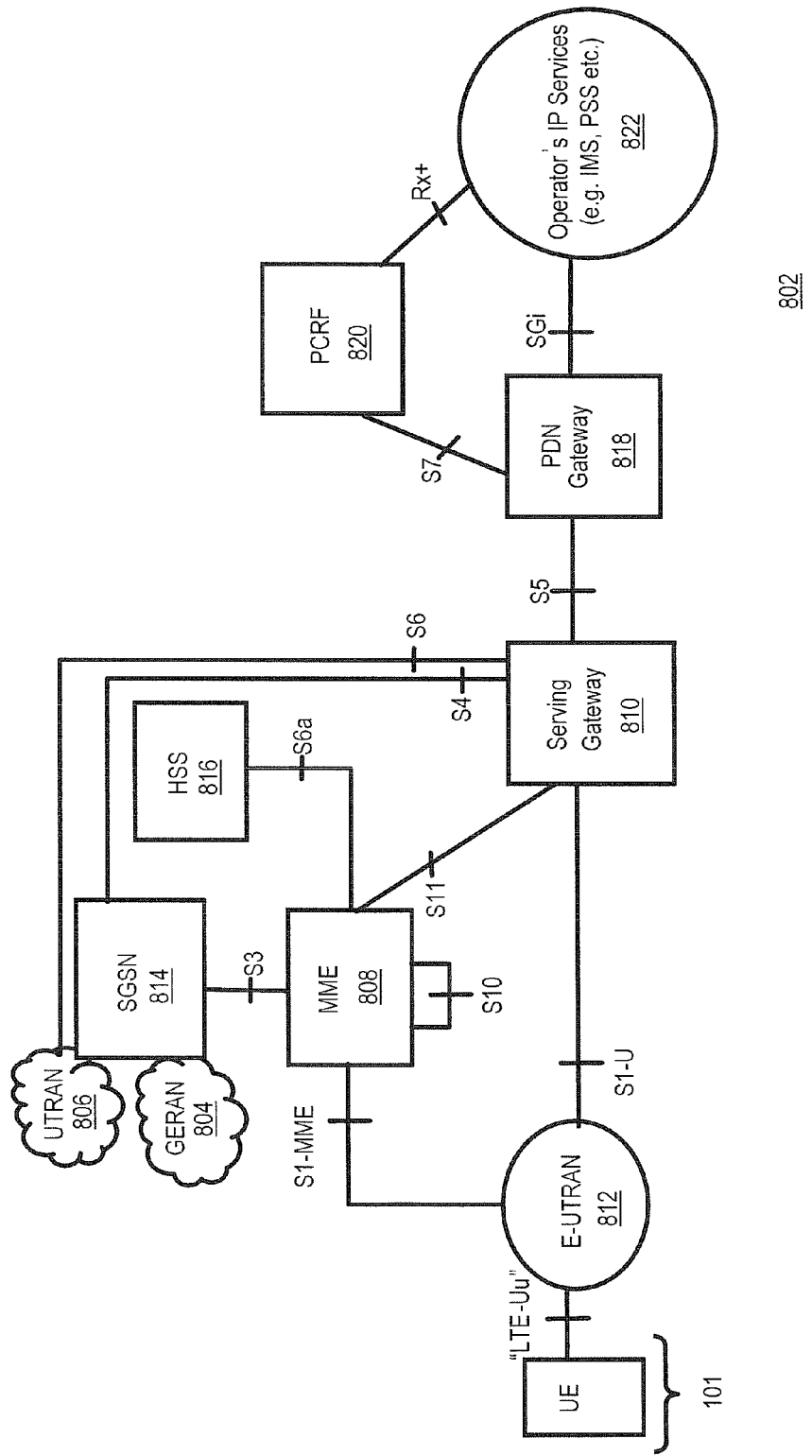
Figure 8C:
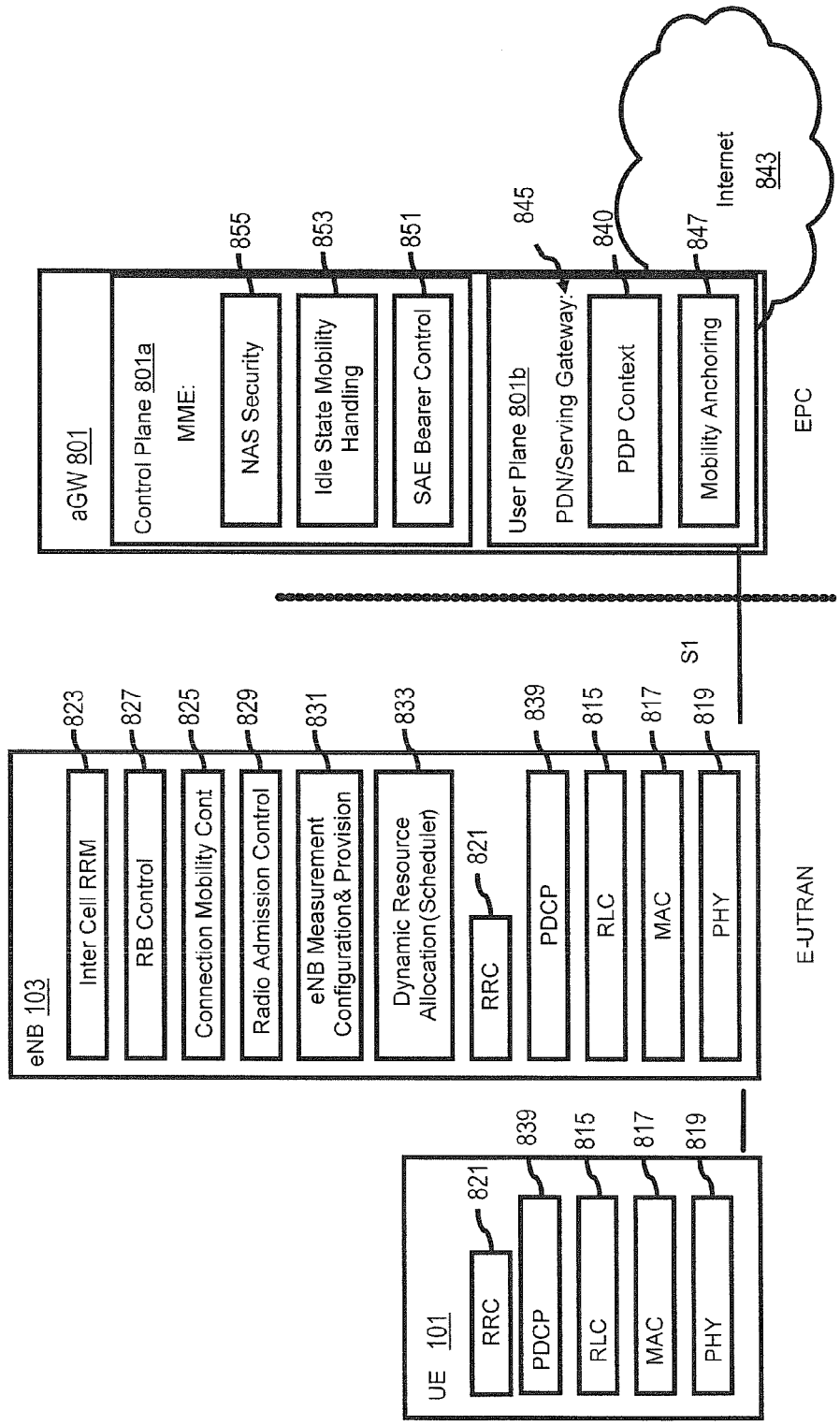

Under the 3GPP LTE architecture (as shown in FIGS. 8A-8C), the base station 103 denoted as an enhanced Node B (eNB). The UE 101 can be any type of mobile stations, such as handsets, terminals, stations, units, devices, multimedia tablets, Internet nodes, communicators, Personal Digital Assistants or any type of interface to the user (such as "wearable" circuitry, etc.). The UE 101 communicates with one or more mobile networks—e.g., a public land mobile networks (PLMNs) (not shown)—as the UE 101 moves from one location to another. In a cell search procedure, the UE 101 basically scans and listens in the surrounding environment in order to find out which PLMNs and cells it can detect (i.e., "hear").

The cell search procedure is used in the following scenarios: (1) cell selection: (after UE power on or after cell lost); and (2) PLMN search after UE is already switched on (user triggered PLMN search or autonomous PLMN search like "home PLMN search"). Cell search involves determining the strongest cells, and finding out timing of those cells (e.g., frame timing etc.).

The base station 103 employs a transceiver (not shown) to exchange information with the UE 101a via one or more antennas, which transmit and receive electromagnetic signals. For instance, the base station 103 may utilize a Multiple Input Multiple Output (MIMO) antenna system for supporting the parallel transmission of independent data streams to achieve high data rates with the UE 101. The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can also be realized using a DFT-S-OFDM principle, which is detailed in 3GGP TR 25.814, entitled "Physical Layer Aspects for Evolved UTRA," v. 1.5.0, May 2006 (which is incorporated herein by reference in its entirety). SC-FDMA, also referred to as Multi-User-SC-FDMA, allows multiple users to transmit simultaneously on different sub-bands.

Furthermore, the base station 103 employs a cell configuration logic 105 for configuring cell specific (or in a sectorized transmission, the sector specific) transmission. The cell configuration logic 105 can also create synchronization sequences for transmission, as well as create the synchronization mapping to symbols according to a standardized protocol, for instance. According to certain embodiments, these synchronization sequences are system independent. In other words, such sequences can be detected irrespective of the capabilities of the UE 101. Also, for system or network independent synchronization sequences, it is characteristic that their bandwidth, their alignment respective to the carrier center frequency, their organization in symbol time blocks and their sequence modulation are equal for different systems. According to certain embodiment, these sequences do not depend on the system itself. System identification is provided by other means than differentiation by the sequences, sequence families or system specific organization of their transmission. In accordance with certain embodiments, "system" refers to a set of standards and their implementation. A "network" is an implementation and deployment of a standard release or a mixture of releases of the same standard. Release updates can be performed gradually, and by a software update or renewed hardware.

UE capability determines how network may provide services to the UE 101 in a given capability category. The UE 101 may be handled differently from one network to another network (not only by its capability), but depending, for example, on the subscriber class, activated services or quality of service (QoS) or user profiles.

To ensure reliable data transmission, the system 100 of FIG. 1, in certain embodiments, uses concatenation of Forward Error Correction (FEC) coding and an Automatic Repeat Request (ARQ) protocol commonly known as Hybrid ARQ (HARQ). Automatic Repeat Request (ARQ) is an error detection mechanism using error detection logic (not shown). This mechanism permits the receiver to indicate to the transmitter that a packet or sub-packet has been received incorrectly, and thus, the receiver can request the transmitter to resend the particular packet(s). This can be accomplished with a Stop and Wait (SAW) procedure, in which the transmitter waits for a response from the receiver before sending or resending packets. The erroneous packets are used in conjunction with retransmitted packets.

Each of the UEs 101a-101n includes a synchronization logic 107a, 107n (respectively) for efficiently determining a proper (i.e., compatible) system to access for communication services. According to one embodiment, the system of FIG. 1 relates to cell search and synchronization within a host of cellular/wireless communication systems, which may serve various cells 109a-109c. It is recognized that the operation bands and operation frequency ranges continue to grow in versatility, in large part because of fragmentation of spectrum allocations globally, regionally and locally. Scalable bandwidth operation requires the UE 101 to engage in the laborious task of searching cells 109a-109c and carriers on different frequency bands at different signal bandwidths.

By way of example, E-UTRAN (Evolved Universal Terrestrial Radio Access Network), the cell search procedure is as follows. First, the UE 101 select a frequency (~max amount: 60 MHz/200 kHz=300 frequencies to search). Alternatively, the channel raster can be 100 kHz (the frequency bands can be the same as in 3G); this requires more frequencies to be searched if a 2.1 GHz band (2.1 GHz band is ~60 MHz wide) is used—i.e., 60 MHz/100 kHz=600 search frequencies. Next, the UE 101 searches a PSCH (Primary Synchronization Channel) (primary sync) for peaks (this phase takes ~10 ms) for the selected frequency. The strongest PSCH cross correlation peak is selected for further investigation. Thereafter, the UE 101 searches for peaks in the SSCH (Secondary Synchronization Channel) (secondary sync) (this phase takes 5-10 ms) for the selected PSCH peak. The strongest cross correlation SSCH peak is selected. After frame border is determined, the UE 101 can start a P-BCH search. P-BCH is a very short system information "block" (size about 30 bits); this procedure is repeated every 10 ms. That is, P-BCH has a fixed allocation in time (repeated in every radio frame, i.e., 10 ms) and frequency domain (1.25 Mhz bandwidth).

The UE 101 can then search the P-BCH (Primary Broadcast Channel) (max time for this process is 10 ms). Upon execution of this search, the UE 101 has knowledge of the system frame number, cell bandwidth and master information block (MIB) scheduling. MIB is a system information block that is repeated periodically, e.g., every 80 ms. After receiving MIB, the UE 101 can decide how to continue with cell search (e.g., do the cell belong to own PLMN or not). This message can also include the scheduling information of SIB (secondary system information blocks).

As mentioned, due to different nature of deployments, the UE 101 is required to search cells 109a-109c in its geographical neighborhood from several frequencies, even from very wide bandwidth blocks. The UE 101 may also find cells at close center frequencies with possibly partially overlapping signal bandwidths, if the networks share resources according to the Flexible Spectrum Use (FSU) principles. Thus, the probability of finding more cells of different types continues to increase in the future. As a result, a UE 101 in a given location may find several cells, either with the same system parameters or with other system parameters. For example, a UE 101 may find far away cells transmitting to sectors by, e.g., 43 dBm and may at the same time find several close by cells transmitting at, e.g., −10 dBm. Thus searching and detecting cells requires significant UE activity-ON time and processing power to correlate noise in order to find any cells; as such, power consumption can be quite significant.

The system 100 of FIG. 1 provides a synchronization structure and cell access design that is compatible among multiple system designs of E-UTRA and IMT-A. By way of example, an UE 101 is configured to interpret system indication (system indicator or release tag) bit-fields from the Primary Broadcast Channel (P-BCH) or other system information channels. Other such channels or system information blocks may be defined as scheduled extensions of the master information block (MIB) on the P-BCH. The system indicator specifies the proper operation mode of parameterization. The UE 101 can determine whether to access a cell of a given release support or whether to continue searching for other cells.

A cell search and detection process is effectively a search algorithm that is capable of detecting cells of variant systems at an optimal single search-round manner. It is noted that E-UTRA cell detection provides excellent performance—i.e., it allows detection at very low SINR (Signal to Interference Noise Ratio) and yet provides sufficiently large number of sequences (>500) to enable cell design so that the cells using the same carrier center frequency can be separated by a sufficient propagation distance before having to reuse the same cell search and synchronization sequences.

Figure 2:
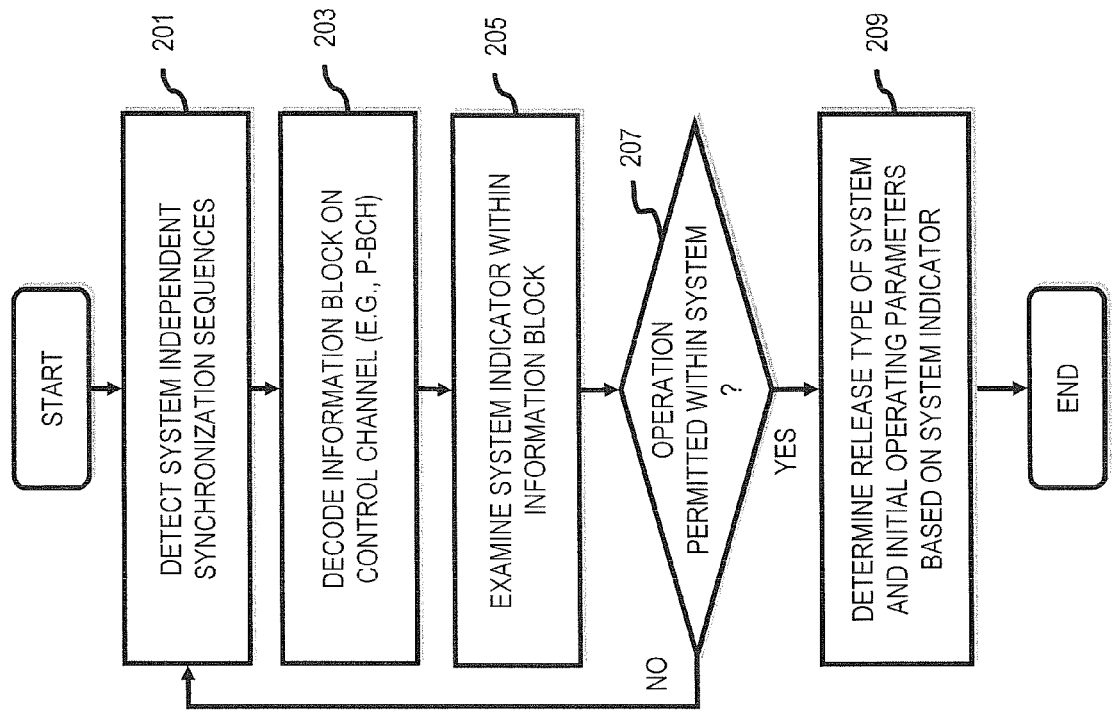
FIG. 2 is a flowchart of a cell search and detection process, according to an exemplary embodiment.

FIG. 2 is a flowchart of a cell search and detection process, according to an exemplary embodiment. For the purposes of illustration, this cell search and detection process is explained with respect to E-UTRA Release'8 compatible synchronization channels as the baseline for all future E-UTRA releases and IMT-A technologies applying a multi-carrier technology (e.g., Orthogonal Frequency Division Multiple Access (OFDMA)) in the downlink. In an exemplary embodiment, the cell search and synchronization structure is discontinuous—i.e., allows duplex switching in between synchronization bursts. Also, the structure permits non-coherent detection and averaging, thereby enabling signal integration over a long period. Further, the structure provides symbol spacing that can be kept constant despite the parameterizable cyclic extensions between symbols.

The approach, according to various embodiments, provides E-UTRA compatible cell search and synchronization sequences. The sampling instances are compatible to E-UTRA sampling. That is, the sampling instances are exactly the same as for E-UTRA or they are an integer oversampled multiple of it. Searching of E-UTRA and the other E-UTRA compatible systems may thus occur directly with the E-UTRA sampling rate or in an alternative embodiment the search may happen with oversampling, which can result finding of both E-UTRA and the other E-UTRA compatible system at the same search event.

In step 201, the cell search and detection process involves detecting system independent synchronization sequences. For instance, frequency and time correction can be utilized to detect these synchronization sequences. The operation, after searching and finding a cell and being able to decode the control channel (e.g., P-BCH), is to check the system indicator or release tag to determine the type of communication system the UE 101 has accessed. For example, the UE 101 (acting as a receiver) is tuned to a candidate center frequency. The UE 101 then searches cells by noise and sequence correlation using power measurements. Upon detecting the cell, the UE synchronizes the cell by time and frequency correction, and finds the cell specific pilot reference signals. The channel is then equalized. Thereafter, the information block is decoded, and the system indicator is examined (per steps 203 and 205).

As mentioned, a system indication (or a release tag) is therefore introduced as an Information Element (IE) inside the coded information block to enable further differentiation of the access systems. The term "release tag," according to certain embodiments, refers to a complete set of standard specifications, which exactly define the operation of a telecommunication system. For example, the release tag may include either a standard, a standard release version (e.g., series number), a system revision number, or other information corresponding to one or more system parameters in use on a carrier of the network. The system and devices need to strictly satisfy all the mandatory features of the normative specifications, including the radio performance requirements. New building blocks and features may be included in the existing systems and specifications, by evolving them to a new released version of the set of specifications. Thus, the set of telecommunication specifications and their version numbers shortly indicate a large set of mandatory features and performance requirements to satisfy. (Examples of such standard specifications are GERAN, GPRS, UTRAN Release'3, UTRAN Release'4, UTRAN Release'5, UTRAN Release'6, UTRAN Release'7, EUTRAN Release'8, EUTRAN Release'9, IEEE802.11a, IEEE 802.11b, IEEE802.11,c, IEEE802.11n, IEEE802.16, IEEE802.16e, IEEE80216m, etc).

In step 205, the system indicator within an information block is examined. The process then determines whether operation is permitted within the current system (step 207). If the capability of the UE 101 does not permit the UE 101 to operate in this system, the UE 101 will continue searching other cells. If the UE 101 observes that is able to operate in the present system, the UE 101 will know, based on the system indicator, the release type of the system as well as the initial operating parameters (i.e., parameterization) required to start operating within the network (step 209).

It is noted that after finding the carrier center frequency of a given cell, the systems may have utilize radically different parameters for operation, e.g., different bandwidth, different kind of control structures, different resource units etc. Thus, cell detection would not allow the UE 101 to know, what kind of system it has actually detected. This approach, according to certain embodiments, proposes to maintain the cell access control channel—e.g., Broadcast Channel (Primary-BCH)—equal to E-UTRA definitions. In one embodiment, the system indicator is placed within the P-BCH information block; this requires a relatively small amount of bits, while keeping the decoding performance high. The information block may contain reserved for future use bit-fields (and is thus "future proof"). In other words, the P-BCH structure can be configured to accommodate future developments, but remains E-UTRA compatible. According to certain embodiments, compatibility requires that at least one of the synchronization structure, the synchronization sequences, the P-BCH symbol mapping and its decoding structure are compatible.

It is recognized that under certain scenarios the UE 101 may encounter a system that is extended beyond its capabilities. That is, the UE 101, even with lower or less capabilities, is able to operate in the system. Such a scenario is akin to requiring backwards compatibility of the UE 101; this can be specified by the system indicator. For example, the P-BCH release and backwards compatibility indication can be of the following type:

System Indicator (or a release tag, a version tag or a revision number):

Release 8|Release 9|IMT-A 1|IMT-A2| . . . |IMTA-N

This format, according to one embodiment, can be described as a bit list from bit-0 . . . bit-(N+1). These fields allow markings of the highest capability of the system, as well as backwards compatibility classes, as provided Table 1, for example:

TABLE 1

| SYSTEM INDICATOR VALUE | DESCRIPTION |
| --- | --- |
| 1 0 0 0 . . . 0 | Release'8 system (bit-0 is set) |
| 0 0 0 1 . . . 0 | IMTA-2 system (bit-3 is set) |
| 0 1 0 1 . . . 0 | IMTA-2 system, which allows Release'9 capable UE to operate in the system, but with those limitations that Release'9 capability of the UE will have an impact on. (bit-1 and bit-3 are set.) |

This UE capability impact may, for example, be lower scheduling priority of release'9 UE compared to IMTA-2 capable UE, or limited bit rates of Release'9 UE compared to IMTA-2 UE. This might also result in a different fee structure (e.g., more expensive communication) of Release'9 UE compared to an IMTA-2 UE. This may also have an impact that network service palette may not be fully at hand for the Release'9 capable UE, as it were for the IMTA-2 UE. However, even with these limitations, it may be important for Release'9 terminal to operate in IMT-A network, in case IMT-A is designed that way. The given bit combination is larger than an alternative example of having bit coding for Release'8, Release'9, IMT-A-1, IMT-A-2, . . . IMT-A-N which only requires log 2(N+2) bits.

It is noted that, according to certain embodiments, 3 bits would be sufficient to accommodate a large number of system releases (8 specification releases). Once agreed, these field sizes can well be carried in the current channel coding design of the P-BCH. An additional bit can be reserved for the future-use; the field would in this case sum to 4 bits (16 specification releases), respectively. Under certain circumstances, even 2 bits (4 specification releases) may be sufficient.

Figure 3:
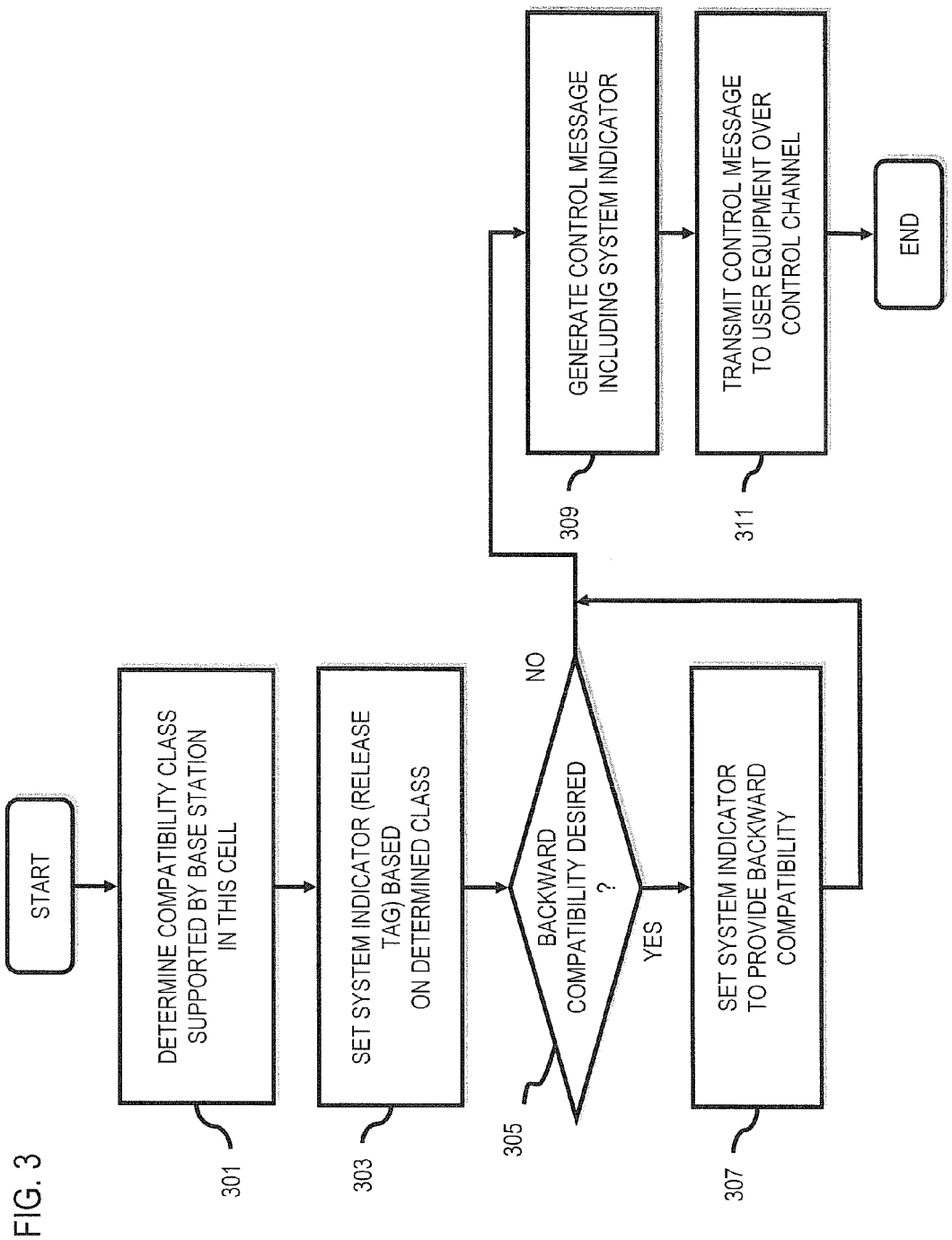
FIG. 3 is a flowchart of a process for setting a system indicator to specify system compatibility information, according to various exemplary embodiments.

FIG. 3 is a flowchart of a process for setting a system indicator to specify system compatibility information, according to various exemplary embodiments. In step 301, the process determines compatibility class that is supported by a base station (e.g., base station 103) of the particular cell. The system indicator can then be set using the determined class, as in step 303. The process can also determine whether backward compatibility is desired, per step 305; if so, the value of the system indicator can be specified accordingly (step 307). In step 309, a control message specifying the system indicator is generated. This control message is subsequently transmitted (e.g., broadcast) over the control channel, as in step 311. In the case of a broadcast, multiple mobile stations can concurrently receive the control message.

Figure 4:
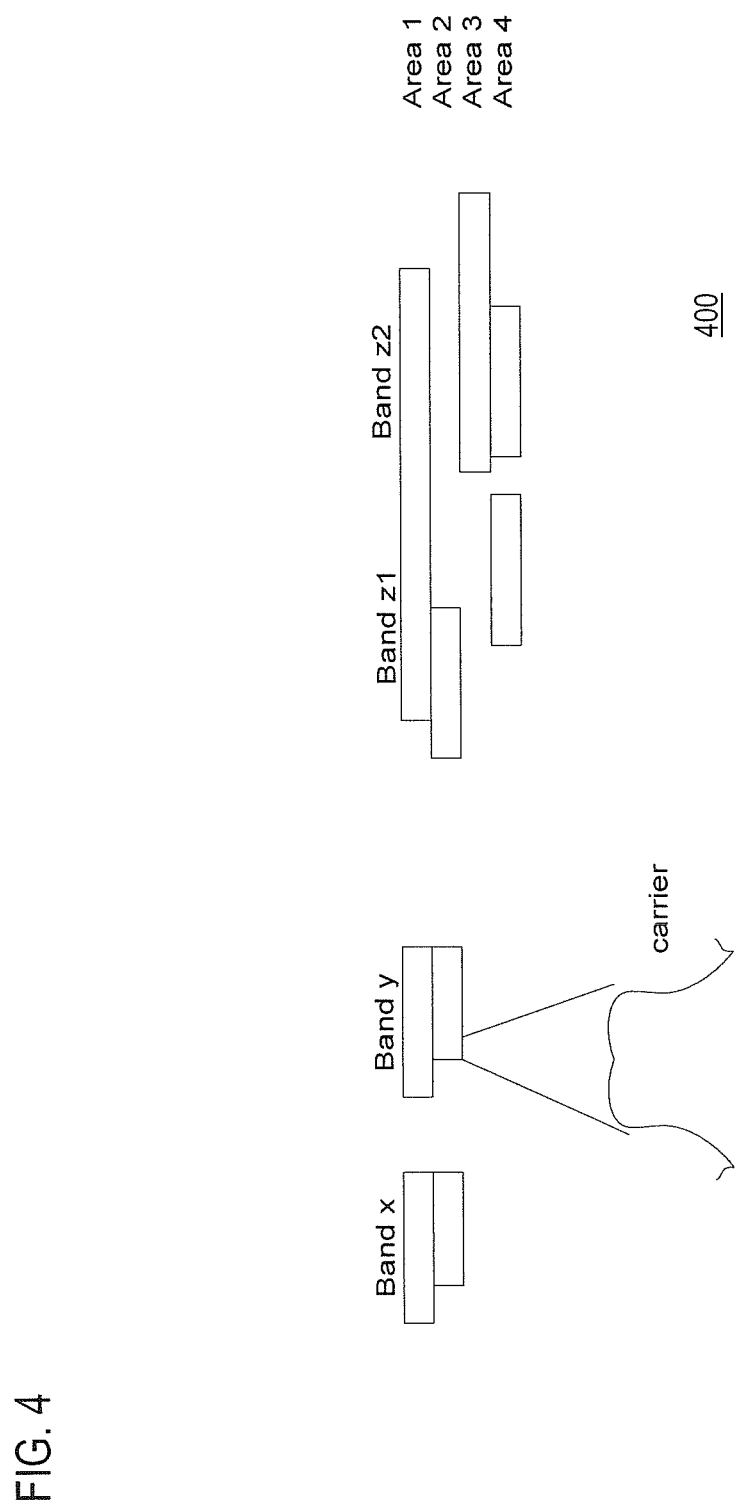
FIG. 4 is a diagram of multiple bands allocated for various communication systems, according to various exemplary embodiments.

FIG. 4 is a diagram of multiple bands allocated for various communication systems, according to various exemplary embodiments. In an exemplary spectral allocation 400, multiple bands are utilized over multiple geographical areas (e.g., Areas 1-4). For instance, within Area 1, Bands x, y, z1, and z2 are employed. In Area 2, bands x, y, and z1 are provided. Area 3 provides only band z2, while Area 4 uses both z1 and z2. It is noted that if the operation bandwidth uniquely indicates the specification release that the UE is operated at, the defined bandwidth information, as provided in the standard P-BCH, may be sufficient. However, it cannot be expected that in the IMT-A system, all operation bandwidths would be larger than 20 MHz. Thus, a separate release tag may be used (at least to separate the systems when applying 20 MHz bandwidth). FIG. 4 shows multiple bands being allocated for mobile and wireless communication systems globally, regionally and locally, for instance.

Figure 5A:
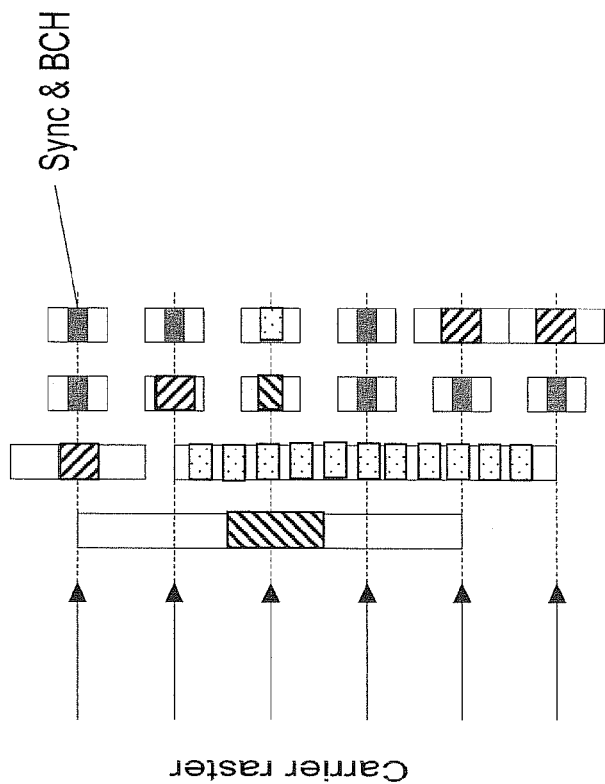
FIGS. 5A and 5B, are diagrams, respectively, of a structure for cell search procedure associated with compatible and non-compatible designs, according to various exemplary embodiments.
Figure 5B:
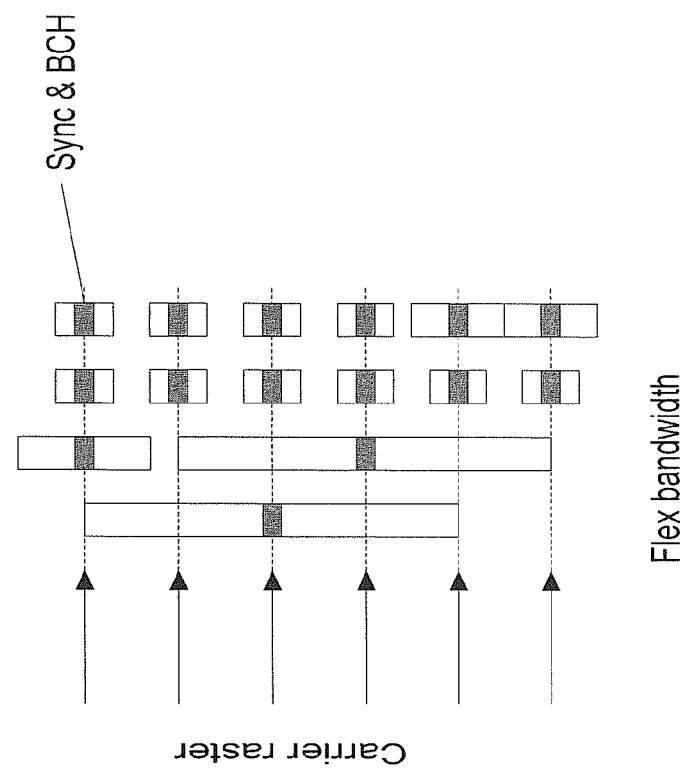

FIGS. 5A and 5B, are diagrams, respectively, of a structure for cell search procedure associated with compatible and non-compatible designs, according to various exemplary embodiments. Namely, these diagrams provide an example of carrier/cell search in a scalable bandwidth arrangement over a raster of center frequencies. The operation in un-licensed bands may imply further increase of searches, whenever the channel raster is not well-known (as is the case in the licensed bands). FIG. 5A shows a structure 501 with compatible cell search and synchronization designs.

In the compatible design, the sync arrangement of different systems has exactly the same bandwidth, and the same frequency composition relative to the carrier center frequency. Furthermore, the sync arrangement provides equal arrangement in symbol time blocks and equal choice of sequences from the defined set of sequences in the defined sequence family.

By contrast, FIG. 5B shows a structure 503 with non-compatible designs. For the purposes of explanation, only the frequency domain is shown; it is noted that time spacing and sequence design can be employed for the synchronization structures. According to certain embodiments, continuous synchronization sequences and discontinuous sequences (either in time or in frequency) may be used. However, in the discontinuous case, the distance between sequences may differ in each non-compatible design accordingly. The synchronization channels may have different alignments (as illustrated by the different patterns) with respect to either center frequency, different bandwidth, or different organization in symbol time blocks and different families of sequences (e.g., zirp, m-sequences, ZAC, etc.).

FIG. 6 is a diagram of a resource structure configured to accommodate future systems, according to an exemplary embodiment. In this example, each of the transmission frames 601, 603 is divided (i.e., partitioned) into symbols, slots and frame periods in time, and frequency resource units over the scalable carrier bandwidth in frequency. In one embodiment, the synchronization structure complies exactly with E-UTRA, so that at given slot index #0 and #5 (of 10 ms frame), given symbol indexes are reserved for primary synchronization sequence (PSC) and secondary synchronization sequence (SSC). Further symbols are reserved around the PSC/SSC for the P-BCH. The bandwidth of PSC/SSC and P-BCH is limited and is independent of the actual system bandwidth. For higher bandwidths, higher sampling rates are used and the sequences may thus be kept unchanged but oversampled or the sequences may be extended by interpolated samples.

Figure 7:
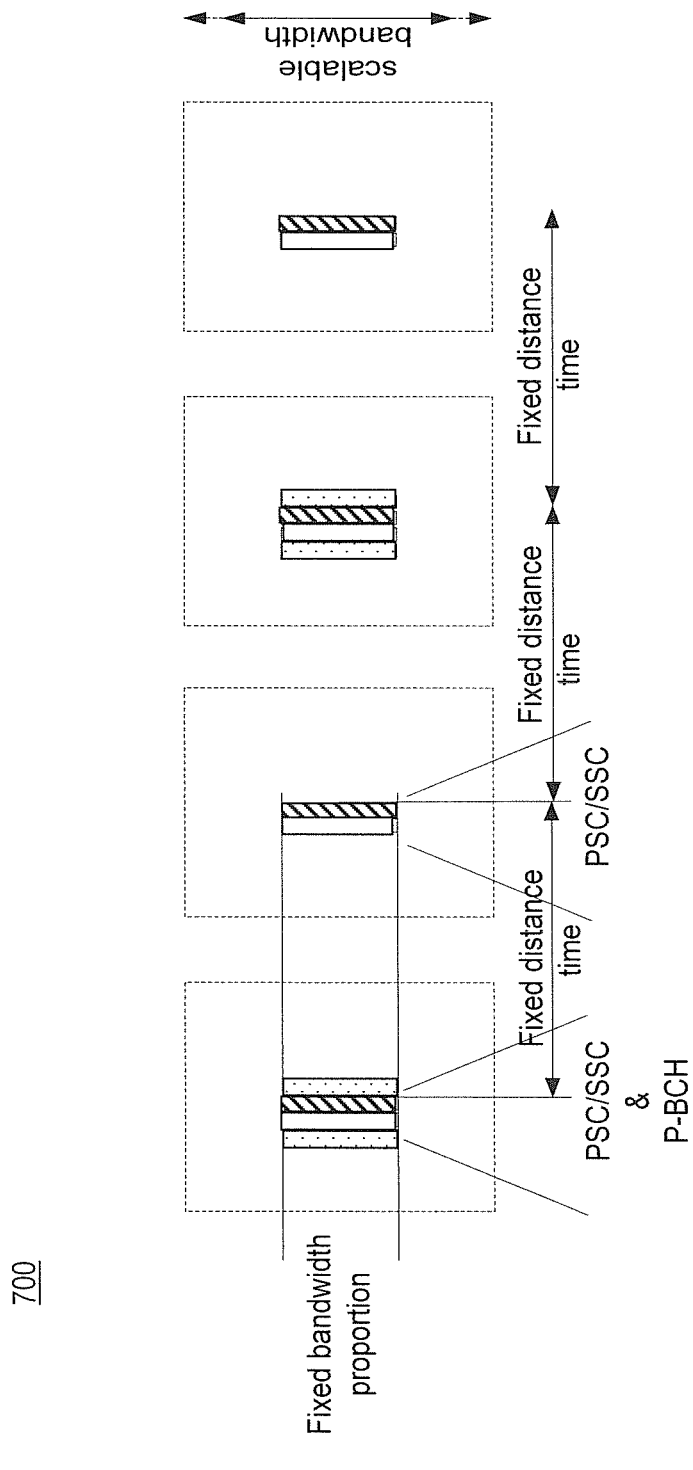
FIG. 7 is a diagram of a cell search and synchronization structure, according to an exemplary embodiment.

FIG. 7 is a diagram a cell search and synchronization structure, according to an exemplary embodiment. By way of example, a cell search and synchronization structure 700 is described for IMT-A. Irrespective of the other choices for system design, this approach, according to certain embodiments, can apply the same PSC/SSC and P-BCH structure for the IMT-A system as shown in FIG. 6. The frame is shaded as its impact to the synchronization structure is vanished.

Tables 1 and 2 provide traditional cell search algorithms that may be utilized in the system of FIG. 1 for non-compatible designs:

TABLE 1

Try center freq => try LTE
=> try IEEE
=> try IMTA-1
=> try IMTA-2
=> . . .
Select next center frequency in the candidate raster
=> try LTE
=> try IEEE
=> try IMTA-1
=> try IMTA-2
=> . . .
and so on
at any step, once the cell is selected and synchronized,
find the system indication specific to a given technology.

Note:
* new system indication

TABLE 2

Try with LTE candidate technology
Try center freq => try LTE
Select next center frequency in the candidate raster
=> try LTE
and so on
at any step, once the cell is selected and synchronized,
find the LTE system indication repeat with other
candidadate technology e.g., IEEE
Try center freq => try IEEE TABLE 2-continued Select next center frequency in the candidate raster
=> try IEEE
and so on
at any step, once the cell is selected and synchronized,
find the IEEE system indication (e.g. a MAP message)
repeat with other candidate technologies IMTA*
Try center freq => try IMTA*
Select next center frequency in the candidate raster
=> try IMTA*
and so on
at any step, once the cell is selected and synchronized,
find the IMTA* system indication Note:
*new system indication Moreover, Table 3, according to an exemplary embodiment, provides an enhanced single search-round for different technologies using a compatible synchronization structure:

TABLE 3

Try center freq
=> try detection (indication any of LTE, IEEE, IMTA*)
Select next center frequency in the candidate raster
=> try detection (indication any of LTE, IEEE, IMTA*)
and so on
at any step, once the cell is selected and synchronized,
find the system indication from the
PBCH to separate LTE, IEEE, IMTA*

Note:
*new system indication

Although the sync structure is explained at the middle of the carrier bandwidth, it is contemplated that other arrangements can be utilized. For example, if the UE 101 is able to find the sync structure at a given frequency of the center frequency raster, the actual carrier bandwidth may still be placed asymmetrically around the sync structure. However, this asymmetry has to be indicated separately.

As explained, the above arrangement and associated processes can be effected in an LTE system. Such a system is now explained. However, it is recognized that other communication architectures can be utilized as well.

FIGS. 8A-8C are diagrams of communication systems having exemplary long-term evolution (LTE) architectures, in which the user equipment (UE) and the base station of FIG. 1 can operate, according to various exemplary embodiments. By way of example (shown in FIG. 8A), a base station (e.g., destination node) and a user equipment (UE) (e.g., source node) can communicate in system 800 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA. As seen, base stations 103a-103n constitute a radio network of eNBs as EUTRAN.

The communication system 800 is compliant with 3GPP LTE, entitled "Long Term Evolution of the 3GPP Radio Technology" (which is incorporated herein by reference in its entirety). As shown in FIG. 8A, one or more user equipment (UEs) communicate with a network equipment, such as a base station 103, which is part of an access network (e.g., WiMAX (Worldwide Interoperability for Microwave Access), 3GPP LTE (or E-UTRAN), etc.). Under the 3GPP LTE architecture, base station 103 is denoted as an enhanced Node B (eNB).

MME (Mobile Management Entity)/Serving Gateways 801 are connected to the eNBs 103 in a full or partial mesh configuration using tunneling over a packet transport network (e.g., Internet Protocol (IP) network) 803. Exemplary functions of the MME/Serving GW 801 include distribution of paging messages to the eNBs 103, termination of U-plane packets for paging reasons, and switching of U-plane for support of UE mobility. Since the GWs 801 serve as a gateway to external networks, e.g., the Internet or private networks 803, the GWs 801 include an Access, Authorization and Accounting system (AAA) 805 to securely determine the identity and privileges of a user and to track each user's activities. Namely, the MME Serving Gateway 801 is the key control-node for the LTE access-network and is responsible for idle mode UE tracking and paging procedure including retransmissions. Also, the MME 801 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

In FIG. 8B, a communication system 802 supports GERAN (GSM/EDGE radio access) 804, and UTRAN 806 based access networks, E-UTRAN 812 and non-3GPP (not shown) based access networks, and is more fully described in TR 23.882, which is incorporated herein by reference in its entirety. A key feature of this system is the separation of the network entity that performs control-plane functionality (MME 808) from the network entity that performs bearer-plane functionality (Serving Gateway 810) with a well defined open interface between them S11. Since E-UTRAN 812 provides higher bandwidths to enable new services as well as to improve existing ones, separation of MME 808 from Serving Gateway 810 implies that Serving Gateway 810 can be based on a platform optimized for signaling transactions. This scheme enables selection of more cost-effective platforms for, as well as independent scaling of, each of these two elements. Service providers can also select optimized topological locations of Serving Gateways 810 within the network independent of the locations of MMEs 808 in order to reduce optimized bandwidth latencies and avoid concentrated points of failure.

As seen in FIG. 8B, the E-UTRAN (e.g., eNB) 812 interfaces with UE 101 via LTE-Uu. The E-UTRAN 812 supports LTE air interface and includes functions for radio resource control (RRC) functionality corresponding to the control plane MME 808. The E-UTRAN 812 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 808, as a key control node, is responsible for managing mobility UE identifies and security parameters and paging procedure including retransmissions. The MME 808 is involved in the bearer activation/deactivation process and is also responsible for choosing Serving Gateway 810 for the UE 101. MME 808 functions include Non Access Stratum (NAS) signaling and related security. MME 808 checks the authorization of the UE 101 to camp on the service provider's Public Land Mobile Network (PLMN) and enforces UE 101 roaming restrictions. The MME 808 also provides the control plane function for mobility between LTE and 2G/3G access networks with the S3 interface terminating at the MME 808 from the SGSN (Serving GPRS Support Node) 814.

The SGSN 814 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 808 and HSS (Home Subscriber Server) 816. The S10 interface between MMEs 808 provides MME relocation and MME 808 to MME 808 information transfer. The Serving Gateway 810 is the node that terminates the interface towards the E-UTRAN 812 via S1-U.

The S1-U interface provides a per bearer user plane tunneling between the E-UTRAN 812 and Serving Gateway 810. It contains support for path switching during handover between eNBs 103. The S4 interface provides the user plane with related control and mobility support between SGSN 814 and the 3GPP Anchor function of Serving Gateway 810.

The S6 is an interface between UTRAN 806 and Serving Gateway 810. Packet Data Network (PDN) Gateway 818 provides connectivity to the UE 101 to external packet data networks, (e.g. Internet or Intranet) by being the point of exit and entry of Internet traffic for the UE 101. The PDN Gateway 818 performs policy enforcement, packet filtering for each user, charging support, lawful interception and packet screening. Another role of the PDN Gateway 818 is to act as the anchor for mobility between 3GPP and non-3GPP technologies such as WiMax and 3GPP2 (CDMA 1X and EvDO (Evolution Data Only)).

The S7 interface provides transfer of QoS policy and charging rules from PCRF (Policy and Charging Role Function) 820 to Policy and Charging Enforcement Function (PCEF) in the PDN Gateway 818. The SGi interface is the interface between the PDN Gateway and the operator's IP services including packet data network 822. Packet data network 822 may be an operator external public or private packet data network or an intra operator packet data network, e.g., for provision of IMS (IP Multimedia Subsystem) services. Rx+ is the interface between the PCRF and the packet data network 822.

As seen in FIG. 8C, the eNB 103 utilizes an E-UTRA (Evolved Universal Terrestrial Radio Access) (user plane, e.g., RLC (Radio Link Control) 815, MAC (Media Access Control) 817, and PHY (Physical) 819, as well as a control plane (e.g., RRC 821)). These functions are also provided within the UE 101. The eNB 103 also includes the following functions: Inter Cell RRM (Radio Resource Management) 823, Connection Mobility Control 825, RB (Radio Bearer) Control 827, Radio Admission Control 829, eNB Measurement Configuration and Provision 831, and Dynamic Resource Allocation (Scheduler) 833.

The eNB 103 communicates with the aGW 801 (Access Gateway) via an S1 interface. The aGW 801 includes a Control plane 801*a* and a User Plane 801*b*. aGW is a conceptual notation inclusive of MME in the control plane and PDN/serving gateways in the user plane. Evolve Packet Core is the core network architecture that in addition to MME and PDN/serving gateways consists of server architecture e.g. for Internet Multimedia Subsystem (IMS).

The user plane 801*b* includes PDN/Serving gateway functionalities 845, e.g. management of PDP context (Packet Data Protocol context) 840, and a User plane Mobility Anchoring function 847. It is noted that the functionality of the aGW 801 can also be provided by a combination of a serving gateway (SGW) and a packet data network (PDN) GW. The aGW 801 can also interface with a packet network, such as the Internet 843. PDP (Packet Data protocol) context defines the IP connectivity parameters e.g. QoS.

The control plane 801b provides the following components as the Mobility Management Entity (MME): SAE (System Architecture Evolution) Bearer Control 851, Idle State Mobility Handling 853, and NAS (Non-Access Stratum) Security 855.

One of ordinary skill in the art would recognize that the processes for detection of a compatible network may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 9.

Figure 9:
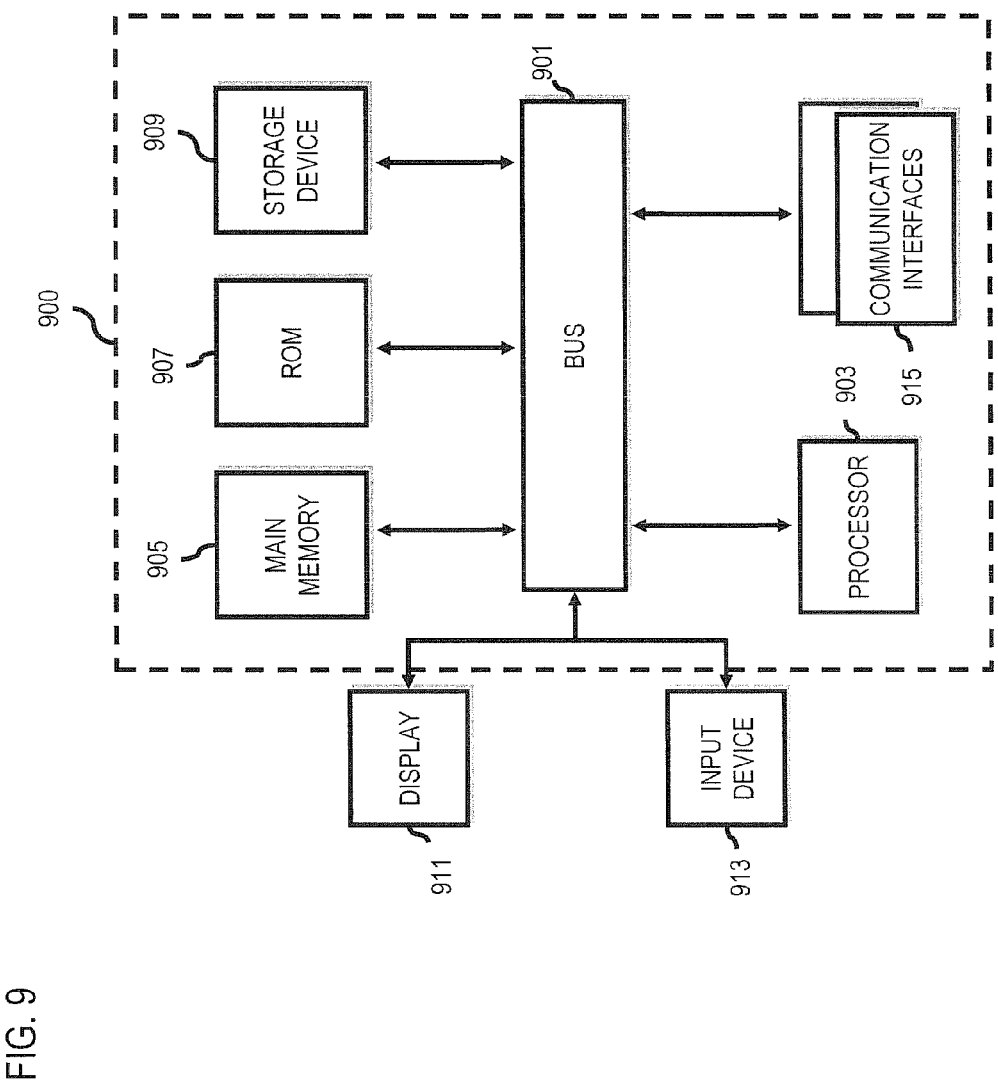
FIG. 9 is a diagram of hardware that can be used to implement an embodiment of the invention.

FIG. 9 illustrates exemplary hardware upon which various embodiments of the invention can be implemented. A computing system 900 includes a bus 901 or other communication mechanism for communicating information and a processor 903 coupled to the bus 901 for processing information. The computing system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computing system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computing system 900 may be coupled via the bus 901 to a display 911, such as a liquid crystal display, or active matrix display, for displaying information to a user. An input device 913, such as a keyboard including alphanumeric and other keys, may be coupled to the bus 901 for communicating information and command selections to the processor 903. The input device 913 can include a cursor control, such as a mouse, a trackball, or cursor direction keys, for communicating direction information and command selections to the processor 903 and for controlling cursor movement on the display 911.

According to various embodiments of the invention, the processes described herein can be provided by the computing system 900 in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 900 also includes at least one communication interface 915 coupled to bus 901. The communication interface 915 provides a two-way data communication coupling to a network link (not shown). The communication interface 915 sends and receives electrical, electromagnetic, or optical signals that carry digital data streams representing various types of information. Further, the communication interface 915 can include peripheral interface devices, such as a Universal Serial Bus (USB) interface, a PCMCIA (Personal Computer Memory Card International Association) interface, etc.

The processor 903 may execute the transmitted code while being received and/or store the code in the storage device 909, or other non-volatile storage for later execution. In this manner, the computing system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
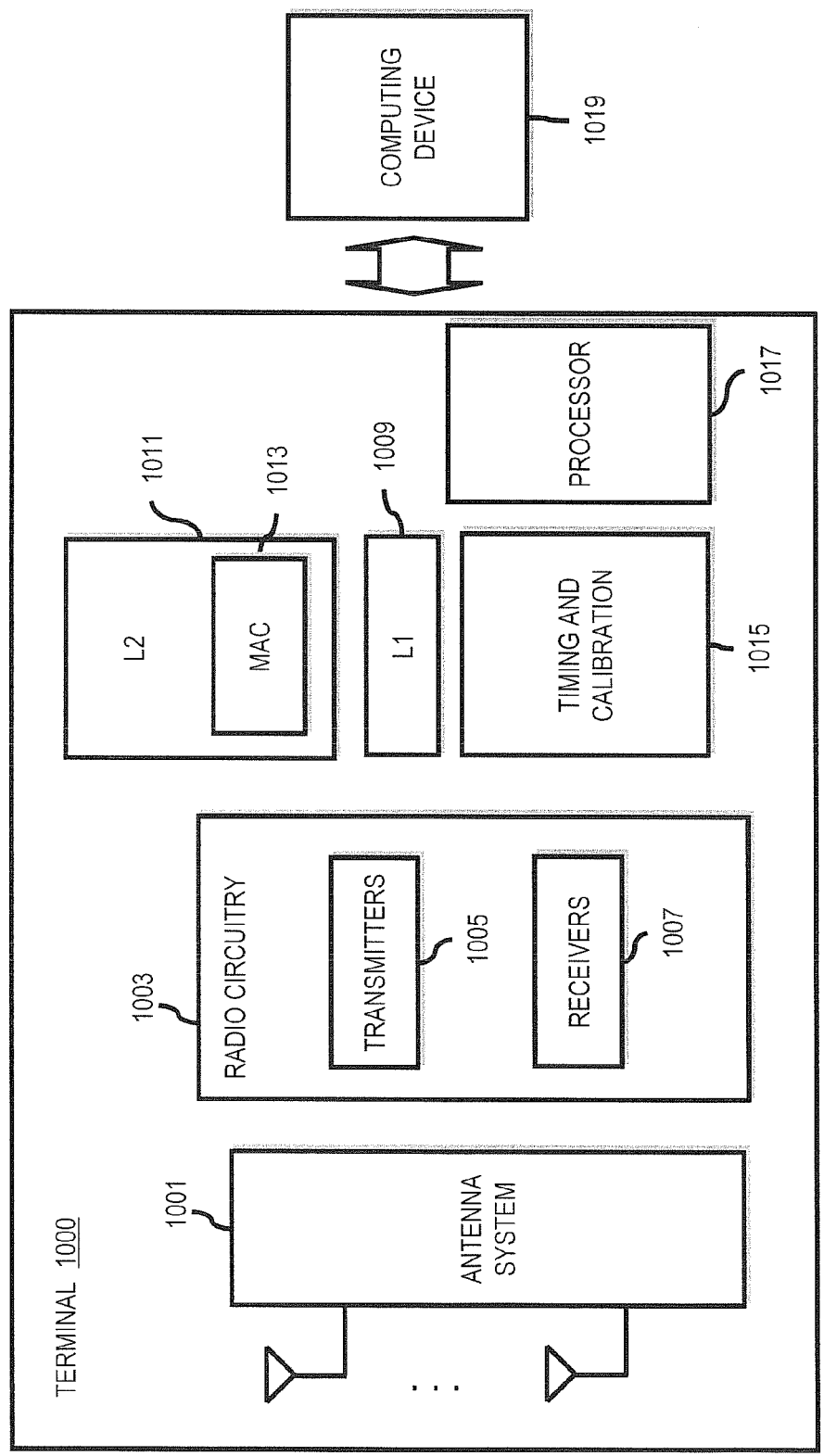
FIG. 10 is a diagram of exemplary components of a user terminal configured to operate in the systems of FIGS. 8A-8C, according to an embodiment of the invention.

FIG. 10 is a diagram of exemplary components of a user terminal configured to operate in the systems of FIGS. 8A-8C, according to an embodiment of the invention. A user terminal 1000 includes an antenna system 1001 (which can utilize multiple antennas) to receive and transmit signals. The antenna system 1001 is coupled to radio circuitry 1003, which includes multiple transmitters 1005 and receivers 1007. The radio circuitry encompasses all of the Radio Frequency (RF)

circuitry as well as base-band processing circuitry. As shown, layer-1 (L1) and layer-2 (L2) processing are provided by units 1009 and 1011, respectively. Optionally, layer-3 functions can be provided (not shown). L2 unit 1011 can include module 1013, which executes all Medium Access Control (MAC) layer functions. A timing and calibration module 1015 maintains proper timing by interfacing, for example, an external timing reference (not shown). Additionally, a processor 1017 is included. Under this scenario, the user terminal 1000 communicates with a computing device 1019, which can be a personal computer, work station, a Personal Digital Assistant (PDA), web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising: detecting system synchronization sequences; decoding, in response to the detected synchronization sequences, an information block on a control channel of one of a plurality of networks, wherein the synchronization sequences are independent of the networks, and the information block includes a system indicator specifying release version of the network, the system indicator is set to provide backward compatibility with another one of the networks; and decoding another control channel of at least one of the plurality of networks based on the release version.

2. A method according to claim 1, wherein the system indicator includes at least one of a standard, a standard release version, a system revision number, or other information corresponding to one or more system parameters in use on a carrier of the network.

3. A method according to claim 1, further comprising: determining a carrier center frequency associated with a cell associated with the one network; and tuning to the determined carrier center frequency.

4. A method according to claim 3, further comprising synchronizing to symbol sequences specific to the cell.

5. A non-transitory computer-readable storage medium carrying one or more sequences of one or more instructions which, when executed by one or more processors, cause the one or more processors to perform a method comprising detecting system synchronization sequences; decoding, in response to the detected synchronization sequences, an information block on a control channel of one of a plurality of networks, wherein the synchronization sequences are independent of the networks, and the information block includes a system indicator specifying release version of the network, the system indicator is set to provide backward compatibility with another one of the networks; and decoding another control channel of at least one of the plurality of networks based on the release version.

6. An apparatus comprising:
at least one processor; and
at least one memory including computer program code;
the at least one memory and the computer program code configured to, with the at least one processor, cause the apparatus to perform at least the following:
detect system synchronization sequences, decode, in response to the detected synchronization sequences, an information block on a control channel of one of a plurality of networks, wherein the synchronization sequences are independent of the networks, and the information block includes a system indicator specifying release version of the one network, the system indicator is set to provide backward compatibility with another one of the networks; and decode another control channel of at least one of the plurality of networks based on the release version.

7. An apparatus according to claim 6, wherein the system indicator includes at least one of a standard, a standard release version, a system revision number, or other information corresponding to one or more system parameters in use on a carrier of the network.

8. An apparatus according to claim 6, wherein a carrier center frequency associated with a cell associated with the one network is determined.

* * * * *